United States Patent Office 3,010,930
Patented Nov. 28, 1961

3,010,930
VINYL RESINS PLASTICIZED WITH A MIXTURE OF DIISODECYL PHTHALATE AND THE 1,4-BUTANEDIOL DIESTERS OF CAPRIC AND CAPRYLIC ACIDS
Wesley D. Schroeder and Hermas N. Beaudet, Pittsburgh, Pa., assignors, by mesne assignments, to Pittsburgh Chemical Company, Pittsburgh, Pa., a corporation of Pennsylvania
No Drawing. Filed Jan. 28, 1958, Ser. No. 711,646
9 Claims. (Cl. 260—31.6)

This invention relates to plasticized vinyl resins.

More specifically, the invention relates to vinyl chloride resins plasticized with a mixture of the diesters of 1,4-butanediol with caprylic and capric acids and diisodecyl phthalate.

It is known to use n-octyl-n-decyl phthalate as a primary plasticizer for vinyl resins, more especially polyvinyl chloride, and various vinyl chloride copolymers. This plasticizer has a unique combination of properties including good low temperature flexibility, a low order of volatility and good processing characteristics for vinyl chloride resins. This plasticizer has been in fairly short supply because of the decreasing availability of the particular straight chain alcohols used in its preparation. Additionally, this plasticizer is relatively expensive.

Diisodecyl phthalate is a relatively low cost plasticizer for vinyl resins and is satisfactory in most of its properties.

The mixed esters of 1,4-butanediol with caprylic acid and capric acid have been employed as plasticizers for vinyl resins. Such plasticizers have good low temperature flexibility but are relatively costly and have poor volatility characteristics.

It is an object of the present invention to develop an inexpensive plasticizer as a replacement for n-octyl-n-decyl phthalate in preparing low temperature flexible vinyl resin compositions.

Another object is to develop such a plasticizer which has low volatility and is easy to process.

A further object is to prepare such a plasticizer which has good heat and light stability.

An additional object is to develop a plasticizer for vinyl chloride plastisols having low viscosity at both high and low rates of shear as well as having good shelf life.

An additional object is to develop a plasticizer for vinyl chloride plastisols having low viscosity and good shelf life.

A still further object is to prepare a plasticizer for vinyl resins having superior resistance to extraction by soap and water.

Still further objects and the entire scope of applicability of the present invention will become apparent from the detail description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by the use of a blend of 15 to 25% of the diester of 1,4-butanediol with a mixture of caprylic and capric acids and 85 to 75% of diisodecyl phthalate as a primary plasticizer blend with vinyl resins.

Preferably, there is employed 40 mol percent caprylic acid and 60 mol percent capric acid, forming the 1,4-butanediol ester. The proportions of caprylic acid to capric acid can range from 35 mol percent to 45 mol percent of caprylic acid and corresponding, 65 mol percent to 55 mol percent of capric acid.

A small amount of caproic acid, e.g., up to 3 mol percent, can be used to replace a portion of the caprylic acid and capric acid, but this is not preferred since there is a noted increase in volatility and also an increase in color formation.

Generally, from 30 to 100 parts of the plasticizer are employed per 100 parts of vinyl resin. A portion of the primary plasticizer of the instant invention can be replaced by various secondary plasticizers, as is well known in the art. It has been found not only does the plasticizer blend of the present invention compare favorably with the more expensive n-octyl n-decyl phthalate in low temperature flexibility and other properties, but also the use of 20% of the 1,4-butanediol ester of caprylic and capric acids with 80% of diisodecyl phthalate was as satisfactory in low temperature flexibility and other properties as a blend of 35% dioctyl adipate and 65% diisodecyl phthalate. Since diisodecyl adipate is at least as expensive as the butanediol esters employed in the present invention and diisodecyl phthalate is comparatively cheap, the present invention has considerable economic advantage over the use of diisodecyl adipate.

It has also been found by using the 20% butanediol ester-80% diisodecyl phthalate blend that not only is outstanding low temperature flexibility obtained, but also that the undesired volatility imparted by the butanediol ester is eliminated.

The plasticizers of the present invention impart to vinyl resins, more particularly vinyl chloride resins, excellent low temperature flexibility, exceptionally low volatility, good processability, superior resistance to extraction by soap and water, unexcelled heat and light stability, low odor and excellent color, low initial viscosity and good shelf life to plastisols, good retention of physical properties in high temperature electrical insulation and good electrical properties.

The plasticizers of the instant invention can be utilized with various vinyl-type polymers including homopolymers, copolymers and interpolymers of vinyl-type monomers. The vinyl-type monomers include those compounds which have at least one vinylidene group, $CH_2=C<$ in their molecule. Examples of vinyl-type monomers which can be polymerized to form polymers which can be plasticized according to the present invention are styrene, alpha methyl styrene, dichlorostyrene, vinyl naphthalene, vinyl phenol, acrylic acid, alpha alkyl substituted acrylic acids, esters of these unsaturated acids, such as methyl acrylate, methyl methacrylate, butyl methacrylate, propyl acrylate, vinylidene halides, such as vinylidene chloride, vinylidene bromide and vinylidene fluoride, vinyl-type esters of inorganic acids including the halogen acids and hydrocyanic acid, such as vinyl chloride, vinyl bromide, acrylonitrile, methacrylonitrile, vinyl esters of monocarboxylic acids, such as vinyl acetate, vinyl chloroacetate, vinyl benzoate, vinyl propionate, vinyl valerate, vinyl laurate, vinyl stearate, vinyl esters of polycarboxylic acids, such as divinyl succinate, divinyl adipate, vinyl allyl phthalate, vinyl methallyl pimelate, vinyl methyl glutarate, vinyl esters of unsaturated acids, such as vinyl acrylate, vinyl crotonate and vinyl methacrylate, the vinyl ethers, such as vinyl methyl ether, vinyl ethyl ether, vinyl butyl ether and vinyl allyl ether and vinyl ketones, such as vinyl methyl ketone, vinyl ethyl ketone and vinyl butyl ketone. The plasticizers can also be used with polyvinyl acetals, such as polyvinyl formal, polyvinyl acetal and polyvinyl butyral resins.

Likewise, the plasticizers can be used with copolymers, such as butadiene-styrene, butadiene-acrylonitrile, isoprene-styrene, ethyl acrylate-styrene, vinyl acetate-methyl methacrylate-methacrylonitrile, isobutylene-butadiene and isobutylene-isoprene.

Preferably, there is employed as the resin polyvinyl chloride or a copolymer of a predominant amount of vinyl chloride with a copolymerizable monomer. Such copolymers include vinyl chloride-vinyl acetate, vinyl chloride-vinylidene chloride, vinyl chloride-vinyl acetate-maleic anhydride, vinyl chloride-vinylidene chloride, vinyl chloride-acrylonitrile, vinyl chloride-butyl acrylate, vinyl chloride-vinyl butyrate, vinyl chlorate-vinyl chloracetate, vinyl chloride-vinyl ethyl ether, vinyl chloride-styrene, vinyl chloride-p-chlorostyrene, vinyl chloride-vinyl pyrrole, vinyl chloride-vinyl pyridine, vinyl chloride-diethyl fumarate, vinyl chloride-diethyl maleate, vinyl chloride-butadiene, vinyl chloride-ethylene and vinyl chloride-isobutylene.

The plasticizers can even be used with cellulose derivatives, such as ethyl cellulose and cellulose nitrate.

In the following examples and throughout the specification and claims, unless otherwise stated, all parts and percentages are by weight.

In Examples 1 to 7, the 1,4-butanediol ester was prepared by reacting the alcohol with a mixture of 2 mol percent caproic acid, 55 mol percent caprylic acid and 42 mol percent capric acid commercially known as Aliphat 3–B. In Example 8, the 1,4-butanediol ester was prepared from a purer acid mixture containing 40 mol percent caprylic acid (Aliphat 2) and 60 mol percent capric acid (Aliphat 3).

The general procedure for preparing the 1,4-butanediol esters used in the present invention was as follows: There was charged into a vessel 1.05 to 1.15 mols of 1,4-butanediol, 2 mols of the indicated fatty acid mixture, 1 gram of toluene sulfonic acid and (when indicated in the example) 2 grams of activated carbon. In all cases, the charge was heated to 150° C. with $CO_2$ sparging at the rate of 2 cubic feet per hour and the water of reaction was drawn off at regular intervals. The heating was continued until the acid number dropped to about 3. Total reaction time was usually 3–7 hours, depending on the amount of excess glycol present and the size of the batch. At the end of the reaction, light soda ash was added to kill the catalyst. After filtering, the residual organic acid was neutralized with a 5–10% caustic soda solution. The crude ester was then washed several times with hot water until the wash showed a pH of 7. The product was dried by heating to 110° C. for 20–30 minutes, then finally treated with 0.5% each of activated carbon and Magnesol (hydrous magnesium silicate). The acceptable color of the product was APHA 125.

While blends of $C_{10}$ to $C_8$ fatty acid in proportions ranging up to 75 to 25 mol percent were tested, as previously indicated, the best combination of properties were obtained when the mol ratio of $C_{10}$ (capric) to $C_8$ (caprylic) acid was 60 to 40 (corresponding to a weight ratio of 63.6% capric acid to 36.4% caprylic acid). The slight improvement in volatility characteristics of the 75 to 25 mol composition did not justify the increase in cost over the preferred composition. The preferred mol ratio of capric acid to caprylic acid gave a product which gave outstandingly low color values and also imparted no odor to the product. The preferred product also was prepared using a 7 molar percent excess of the 1,4-butanediol.

The various performance characteristics and test methods for evaluation of the plasticizer in vinyl resins are summarized below.

| Property | Test method |
|---|---|
| 1. Mechanical—<br>(a) Tensile strength, p.s.i.<br>(b) Ultimate elongation, percent.<br>(c) Modulus at 100% elongation, p.s.i.<br>(d) Hardness, (Shore A). | ASTM D-412 (25° C.) (Scott Tester Model IP-4). |
| 2. Low temperature, Clash-Berg, $T_f$, (° C.). | ASTM D-1043-51. |
| 3. Volatility, activated carbon (hereinafter designated as A.C. volatility). | ASTM D-1203-52T (24 hrs./90° C.). |
| 4. Permanence properties:<br>(a) Oil extraction, percent.<br>(b) Silicic acid migration. | ASTM Oil No. 3 (7 days/25° C.).<br>(60° C./24 hrs.). |
| 5. Mill processing test. | Two roll rubber mill (250° F.). |
| 6. Heat stability. | Circulating air oven (350° F.). |
| 7. Light stability. | Atlas-Fadeometer, Model F-DA-R. |
| 8. Viscosity of plastisols. | (1) Brookfield viscometer, Model LVF (25° C.).<br>(2) Severs extrusion rheometer (25° C.). |

Plastisol formulations having 50 to 100 parts of plasticizer per 100 parts of vinyl chloride resin were prepared using a double planetary-type mixer. Preferably, the plasticizer is kept between 50 and 80 parts per 100 parts of resin. Both Brookfield and Severs viscosities were run on samples of the plastisols after aging 1 hour, 1 day, 7 days and 21 days.

Examples 1 to 8 show the properties of the 1,4-butanediol esters prepared by the procedure outlined above.

| | Ex. 1 | Ex. 2 | Ex. 3 | Ex. 4 | Ex. 5 | Ex. 6 | Ex. 7 | Ex. 8 |
|---|---|---|---|---|---|---|---|---|
| Percent excess glycol | 15 | 10 | 5 | 5 | 5 | 5 | 5 | 7 |
| Activated carbon used? | No | No | No | No | Yes | Yes | Yes | Yes |
| Specific gravity 25/25° C. | 0.924 | 9.925 | 0.925 | 0.922 | 0.922 | 0.922 | | 0.918 |
| Acid number, mg. KOH/gm. | 0.28 | 0.04 | 0.02 | 0.02 | 0.02 | 0.02 | | 0.0 |
| Saponification number, mg. KOH/gm. | 300.6 | 303.9 | 305.1 | 304.8 | 304.5 | 304.0 | | 294 |
| Hydroxyl value, mg. KOH/gm. | 27.0 | 14.7 | 10.1 | 10.5 | 7.2 | 11.2 | | 5.3 |
| Viscosity at 25° C., centistokes | 12.1 | 12.0 | 11.9 | 11.9 | 11.9 | 11.9 | | 13.6 |
| Refractive index, 25° C., $N_D$ | 1.444 | 1.444 | 1.444 | 1.444 | 1.444 | 1.444 | | 1.445 |
| APHA color, approx. | 400 | 400 | 350 | 325 | 115 | 110 | 200 | <50 |
| Total reaction time, hrs. | 1½ | 3¾ | 4 | 7¾ | 3 | 6½ | 3 | |

As indicated in Examples 1–7, the ester was made from a mixture of 2 mol percent caproic acid, 55 mol percent caprylic acid and 42 mol percent capric acid, while in Example 8, the ester was made from a mixture of 60% capric acid and 40% caprylic acid.

For best heat stability in vinyl films, the plasticizer should have a low hydroxyl value, generally less than about 10. Since the diisodecyl phthalate has a hydroxyl value of 2 to 3, it is possible to have a slightly higher hydroxyl value in the butanediol ester. The use of a 15% excess of the butanediol consequently gives a product having a hydroxyl number which is too high for optimum resin stability.

EXAMPLE 9

Blends of various proportions of the butanediol ester of Example 1 with diisodecyl phthalate were compared with n-octyl n-decyl phthalate as plasticizers for polyvinyl chloride using the formulation below (designated hereinafter as Formulation A):

Parts

Geon 101 (polyvinyl chloride, sp. gr. 1.40, av. spec. viscosity 0.55) _____ 100
Plasticizer _____ 54
Mark XI (Ba-Cd laurate) _____ 2
Mark XX (a triaryl phosphate) _____ 1

The results are shown in Table I.

Table I

| Property | Percent butanediol ester of Example 1 in total plasticizer (balance diisodecyl phthalate) | | | | n-Octyl n-decyl phthalate |
|---|---|---|---|---|---|
| | 50 | 33⅓ | 25 | 20 | |
| Tensile strength, p.s.i. | 2,710 | 2,860 | 2,810 | 2,850 | 2,900 |
| Elongation, percent | 445 | 450 | 410 | 415 | 410 |
| Modulus (100%) | 1,340 | 1,450 | 1,510 | 1,560 | 1,450 |
| Shore hardness (10 sec.) | 85 | 86 | 87 | 87 | 85 |
| Clash-Berg, $T_f$, °C | −48 | −42 | −40 | −39 | −39 |
| A.C. volatility | 7.4 | 5.1 | 4.7 | 3.9 | 2.5 |
| Oil extraction | 10.4 | 6.8 | 5.5 | 4.9 | 4.5 |
| 1% soapy water extraction | 2.8 | 1.9 | 1.4 | 1.1 | 0.5 |
| Silicic acid migration | 9.0 | 6.6 | 6.2 | 5.7 | 5.2 | as the stabilizer in place of the mixture of Mark XI and XX with similar results.

From Examples 9–12, it is evident that for the best combination of properties, such as modulus, low temperature flexibility and volatility, the butanediol ester should be within the range of 20–25% of the total of this ester and diisodecyl phthalate to give a plasticizer having properties most closely resembling n-octyl n-decyl phthalate. For low volatility properties and economic reasons, the lower end of the range, i.e., about 20% of the butanediol ester is preferred.

EXAMPLE 13

Formulation A was employed in comparing blends of 20 and 25% of the butanediol esters of Examples 2 and 3 with n-octyl n-decyl phthalate. The results are shown in Table III.

Table III

| Property | Percent butanediol ester of Example 2 (balance diisodecyl phthalate) | | Percent butanediol ester of Example 3 (balance diisodecyl phthalate) | | n-Octyl n-decyl phthalate |
|---|---|---|---|---|---|
| | 25 | 20 | 25 | 20 | |
| Tensile Strength, p.s.i. | 2,880 | 2,860 | 2,820 | 2,840 | 2,900 |
| Elongation, Percent | 420 | 410 | 410 | 400 | 410 |
| Modulus (100%) | 1,550 | 1,540 | 1,520 | 1,500 | 1,450 |
| Shore Hardness (10 sec.) | 87 | 88 | 87 | 88 | 85 |
| Clash-Berg, $T_f$ °C | −39 | −38 | −40 | −38 | −39 |
| A.C. volatility | 4.2 | 3.7 | 4.0 | 3.7 | 2.5 |
| Oil extraction | 5.6 | 4.9 | 6.0 | 4.9 | 4.5 |
| 1% soapy water extraction | 1.1 | 0.8 | 0.9 | 0.8 | 0.5 |
| Silicic acid migration | 5.9 | 5.6 | 6.2 | 6.0 | 5.2 |
| FADEOMETER TEST | | | | | |
| (1) After 150 hours | No change | No change | No change | No change | No change |
| (2) After 400 hours | Spotting, darkening. | Spotting, darkening. | Spotting, darkening. | Spotting, darkening. | Spotting, darkening. |
| Window exposure after 5 months | No change | No change | No change | No change | No change. |

EXAMPLE 10

Example 9 was repeated using 3 parts of Mark XI as the stabilizer in place of the mixture of Mark XI and Mark XX with comparable results.

EXAMPLE 11

Formulation A was employed in comparing blends of various proportions of the butanediol ester of Example 6 with diisodecyl phthalate with dioctyl phthalate, as well as with 100% diisodecyl phthalate. The results are shown in Table II.

Table II

| Property | Percent butanediol ester of Example 6 in total plasticizer (balance diisodecyl phthalate) | | | | | Dioctyl phthalate |
|---|---|---|---|---|---|---|
| | 0 | 15 | 17.5 | 20 | 25 | |
| Tensile strength, p.s.i. | 2,900 | 2,920 | 2,860 | 2,900 | 2,800 | 2,890 |
| Elongation, percent | 385 | 390 | 400 | 400 | 390 | 350 |
| Modulus (100%) | 1,780 | 1,680 | 1,580 | 1,570 | 1,560 | 1,640 |
| Shore hardness (10 sec.) | 89 | 87 | 86 | 86 | 86 | 86 |
| Clash-Berg, $T_f$, °C | −28 | −32 | −35.5 | −36.5 | −38.5 | −28 |
| A.C. volatility | 1.8 | 3.5 | 3.7 | 3.7 | 4.2 | 4.8 |
| Oil extraction | 1.6 | 4.0 | 4.3 | 5.0 | 5.5 | 1.3 |
| 1% soapy water extraction | 0.0 | 0.7 | 0.8 | 0.9 | 1.2 | 0.9 |
| Silicic acid migration | 3.7 | 5.3 | 5.7 | 5.7 | 6.2 | 4.0 |

EXAMPLE 12

Example 11 was repeated using 3 parts of Mark XI

EXAMPLE 14

Example 13 was repeated using 3 parts of calcium stearate in place of the Mark XI and Mark XX with comparable results.

An important consideration in a vinyl resin plasticizer is the relative speed with which it solvates the resin. In a mill processing test at 250° F. the fluxing time to band on the rolls using Formulation A was 5 minutes with diisodecyl phthalate as the plasticizer, 4.5 minutes using 80% diisodecyl phthalate and 20% of the butanediol ester of Example 6 as the plasticizer, and 3.5 minutes using 75% of diisodecyl phthalate and 25% of the butanediol ester of Example 6 as the plasticizer. The use of the butanediol ester thus lowers the fluxing time required as compared with diisodecyl phthalate as the sole plasticizer.

The plasticizers of the instant invention also are useful in vinyl dispersion applications, particularly in plastisols. Such plastisols are used to make good quality coated fabrics, dipped goods and molded articles.

EXAMPLE 15

The butanediol ester of Example 6 was blended with diisodecyl phthalate in 20 and 25% blends (balance being the phthalate) and compared with n-octyl n-decyl phthalate in vinyl chloride resin plastisols. Geon 121 was the vinyl chloride resin used in this example. The results are shown in Tables IV and V.

Table IV

| Plasticizer | Ratio of total plasticizer to resin | Severs extrusion rheometer, p.s.i. | Brookfield, r.p.m. | Viscosity in poises after— | | |
|---|---|---|---|---|---|---|
| | | | | 1 day | 7 days | 21 days |
| Butanediol ester/ diisodecyl phthalate (20/80) (Plasticizer A). | 60 to 100 | 20 | | 84 | 106 | 100 |
| | 60 to 100 | 80 | | 195 | 223 | 221 |
| | 60 to 100 | | 12 | 40 | 48 | 48 |
| | 60 to 100 | | 30 | 36 | 43 | 42 |
| Butanediol ester/ diisodecyl phthalate (25/75) (Plasticizer B). | 60 to 100 | 20 | | 80 | 88 | 87 |
| | 60 to 100 | 80 | | 179 | 186 | 192 |
| | 60 to 100 | | 12 | 34 | 40 | 36 |
| | 60 to 100 | | 30 | 31 | 36 | 32 |
| n-Octyl n-decyl phthalate (Plasticizer C). | 60 to 100 | 20 | | 69 | 76 | 80 |
| | 60 to 100 | 80 | | 154 | 158 | 181 |
| | 60 to 100 | | 12 | 42 | 58 | 62 |
| | 60 to 100 | | 36 | 33 | 50 | 54 |
| Plasticizer A | 80 to 100 | 20 | | 17.6 | 19.2 | 18.4 |
| | 80 to 100 | 80 | | 18.8 | 20.0 | 19.9 |
| | 80 to 100 | | 12 | 11.0 | 12.0 | 12.0 |
| | 80 to 100 | | 36 | 10.0 | 11.0 | 11.0 |
| Plasticizer B | 80 to 100 | 20 | | 17.7 | 17.8 | 17.8 |
| | 80 to 100 | 80 | | 17.0 | 17.5 | 18.6 |
| | 80 to 100 | | 12 | 10.0 | 13.0 | 12.0 |
| | 80 to 100 | | 36 | 10.0 | 12.0 | 10.0 |
| Plasticizer C | 80 to 100 | 20 | | 15.2 | 16.4 | 16.4 |
| | 80 to 100 | 80 | | 20.2 | 20.2 | 17.4 |
| | 80 to 100 | | 12 | 12.0 | 12.0 | 14.0 |
| | 80 to 100 | | 36 | 10.0 | 10.0 | 11.0 |
| Plasticizer A | 100 to 100 | 20 | | 6.3 | 7.2 | 7.1 |
| | 100 to 100 | 80 | | 6.6 | 6.3 | 6.2 |
| | 100 to 100 | | 12 | 7.0 | 6.0 | 7.0 |
| | 100 to 100 | | 36 | 5.0 | 6.0 | 6.0 |
| Plasticizer B | 100 to 100 | 20 | | 6.0 | 7.0 | 6.1 |
| | 100 to 100 | 80 | | 5.7 | 5.5 | 5.4 |
| | 100 to 100 | | 12 | 6.0 | 6.0 | 7.0 |
| | 100 to 100 | | 36 | 4.0 | 6.0 | 6.0 |
| Plasticizer C | 100 to 100 | 20 | | 6.0 | 6.7 | 6.5 |
| | 100 to 100 | 80 | | 5.5 | 6.0 | 6.1 |
| | 100 to 100 | | 12 | 8.0 | 7.0 | 6.0 |
| | 100 to 100 | | 36 | 5.0 | 6.0 | 6.0 |

From Table IV it is seen that plastisols containing the plasticizers of the present invention at both the 20 and 25% blends have somewhat higher initial viscosities than corresponding plastisols containing n-octyl n-decyl phthalate when measured at high rates of shear with the Severs Extrusion Rheometer. When measured at relatively low rates of shear with the Brookfield Viscometer, the blends of the instant invention impart lower viscosities than the n-octyl n-decyl phthalate. In all cases, there was excellent viscosity stability in aging. At 80 and 100 parts of plasticizer per 100 parts of resin, there was very little difference in viscosity between the plasticizer blends of the invention and the n-octyl n-decyl phthalate.

As shown in Table V, however, the plasticizer blends of the present invention impart extreme good viscosity stability, particularly when working at elevated temperatures. The results in Table V were obtained by measuring initial viscosities of one hour old plastisols and then allowing the plastisols to heat age at 110° F. for 18 hours in a circulating air oven, and then allowing the plastisols to come back to room temperature for measuring. The best viscosity stability was obtained with the blend containing 20% of the butanediol ester but the 25% blend also was considerably superior to the n-octyl n-decyl phthalate.

The preferred butanediol ester of Example 8 was used in the following examples.

EXAMPLE 16

In this example a different batch of Geon 101 was used from that in the previous examples. The compositions all contained 100 parts of Geon 101 and 3 parts of a stabilizer (the stabilizer was made of 2 parts Mark XI and 1 part Mark XX) and the indicated amounts of plasticizer. The results are shown in Table VI. The plasticizers of the present invention were tested in Table VI at ratios of vinyl chloride resin to plasticizer of 70% to 30%, 65% to 35% and 60% to 40%, while the diisodecyl phthalate and the n-octyl n-decyl phthalate were tested at a ratio of vinyl chloride resin to plasticizer of 65% to 35% only.

Table V

PLASTISOL VISCOSITIES—EFFECT OF HEAT AGING FOR 18 HOURS AT 110° F.

| Plasticizer | Severs, p.s.i. | Brookfield, r.p.m. | Parts plasticizer per 100 parts vinyl chloride resin | | | | | |
|---|---|---|---|---|---|---|---|---|
| | | | 60 | | | 80 | | |
| | | | After 1 hour | 18 hours at 110° F. | Percent change in viscosity | After 1 hour | 18 hours at 110° F. | Percent change in viscosity |
| Plasticizer A | 20 | | 68 | 96 | 41 | 16.3 | 23.3 | 43 |
| | 80 | | 140 | 174 | 24 | 18.0 | 23.8 | 32 |
| | | 12 | 32 | 61 | 91 | 12.0 | 18.0 | 50 |
| | | 30 | 28 | 55 | 96 | 10.0 | 16.5 | 65 |
| Plasticizer B | 20 | | 48 | 83 | 73 | 12.9 | 21.4 | 66 |
| | 80 | | 112 | 149 | 33 | 14.2 | 18.9 | 33 |
| | | 12 | 28 | 66 | 135 | 10.0 | 16.0 | 60 |
| | | 30 | 25 | 56 | 124 | 9.0 | 13.2 | 47 |
| Plasticizer C | 20 | | 48 | 100 | 108 | 11.9 | 20.8 | 75 |
| | 80 | | 102 | 168 | 65 | 13.8 | 26.5 | 92 |
| | | 12 | 34 | 120 | 250 | 11.0 | 21.0 | 91 |
| | | 30 | 29 | 98 | 240 | 9.0 | 19.0 | 111 |

Table VI

| Plasticizer | Parts of plasticizer (per 100 parts of Geon 101) | | | | |
|---|---|---|---|---|---|
| 20% butanediol ester of Example 8, 80% diisodecyl phthalate | 42.8 | 54 | 66.8 | | |
| Diisodecyl phthalate | | | | 54 | |
| n-Octyl n-decyl phthalate | | | | | 54 |

PROPERTIES OF THE VINYL RESIN COMPOSITION

| | | | | | |
|---|---|---|---|---|---|
| Tensile strength | 3,330 | 2,910 | 2,470 | 2,910 | 2,930 |
| Ultimate elongation | 390 | 420 | 430 | 390 | 410 |
| Modulus (100%) | 2,180 | 1,620 | 1,200 | 1,740 | 1,490 |
| Shore hardness (10 sec.) | 96 | 88 | 79 | 90 | 85 |
| Clash-Berg, $T_f$, °C | −24 | −37 | −46 | −30 | −39 |
| A.C. volatility (90° C./24 hrs.) | 2.6 | 2.9 | 3.4 | 1.7 | 3.0 |
| A.C. volatility (70° C./24 hrs.) | 0.7 | 0.9 | 1.0 | 0.6 | 1.2 |
| Oil extraction (CTR/6 days) | 1.9 | 3.8 | 6.7 | 1.2 | 3.9 |
| 1% soapy water (60° C./24 hrs.) | 0.4 | 0.4 | 0.4 | 0.0 | 0.5 |
| Silicic acid (60° C./24 hrs.) | 3.6 | 5.2 | 6.8 | 3.8 | 5.2 |
| Tear strength | 620 | 490 | 420 | 510 | 500 |
| Gasoline extraction (25° C./1 hr.) | 5.2 | 16.0 | 24.0 | 14.3 | 15.5 |
| Distilled water extraction (25° C./7 days) | 0.1 | 0.1 | 0.1 | 0.0 | 0.1 |

When the mixed 1,4-butanediol esters of caprylic and capric acids are blended with diisodecyl phthalate in the ratio of 20 parts to 80 parts of diisodecyl phthalate and 54 parts of this mixture are then used to plasticize 100 parts of Geon 101 over the range of $C_{10}:C_8$ from 60:40 to 75:25, change in the ratio of $C_8$ to $C_{10}$ acid in the 1,4-butanediol diester has no effect on the Clash-Berg $T_f$ ° C. value, but there is a variance in activated carbon volatility as is shown in Table VII below.

*Table VII*

| $C_{10}:C_8$ (mol ratio) | A.C. volatility | Clash-Berg $T_f$, ° C. |
|---|---|---|
| 60:40 | 3.3 | −37 |
| 65:35 | 2.9 | −37 |
| 70:30 | 2.9 | −37 |
| 75:25 | 2.6 | −37 |

The $C_{10}:C_8$ mol ratio of 60:40 gives an acceptable activated carbon volatility at the lowest price and, hence, is preferred even though it is slightly inferior to the 75:25 mol ratio in activated carbon volatility.

The low temperature flexibility properties of the products of the invention are such that they can be used in vinyl chloride resin formulations without blending with special low temperature plasticizers for such applications as automotive upholstery, toys, e.g., squeeze toys, doll heads and bodies, garden hose, wearing apparel, foams and sponges, e.g., insulation, upholstery padding, sports equipment, electrical insulation, shower curtains, rainwear, baby clothes, table cloths, floor tile, gloves, etc.

The preferred 1,4-butanediol ester-diisodecyl phthalate formulation of the invention ($C_{10}:C_8$ ratio 60:40 and butanediol ester:phthalate ratio 20:40), has a 100% modulus approximately equivalent to dioctyl phthalate and may thus be readily substituted for this phthalate.

EXAMPLE 17

The butanediol ester of Example 8 was blended with diisodecyl phthalate in a 20:80 blend and compared with n-octyl n-decyl phthalate as well as straight diisodecyl phthalate in vinyl chloride resin plastisols. Geon 121 was the vinyl chloride resin used in this example. Geon 121 is a polyvinyl chloride having a specific gravity of 1.41 and an average specific viscosity of 0.59. The results are shown in Table VIII.

*Table VIII*

| Plasticizer | Ratio of plasticizer to resin | Severs, p.s.i. | Brookfield, r.p.m. | Viscosity (poises) after aging— | | |
|---|---|---|---|---|---|---|
| | | | | 1 hr. | 24 hrs. | 14 days |
| Butanediol ester/diisodecyl phthalate (20/80). | 60 to 100 | 20 | | 72 | 78 | 81 |
| | 60 to 100 | 80 | | 145 | 154 | 183 |
| | 60 to 100 | | 12 | 34 | 39 | 45 |
| | 60 to 100 | | 30 | 31 | 35 | 40 |
| n-Octyl n-decyl phthalate. | 60 to 100 | 20 | | 49 | 58 | 67 |
| | 60 to 100 | 80 | | 104 | 113 | 126 |
| | 60 to 100 | | 12 | 33 | 40 | 59 |
| | 60 to 100 | | 30 | 29 | 35 | 50 |
| Diisodecyl phthalate. | 60 to 100 | 20 | | 131 | 141 | 156 |
| | 60 to 100 | 80 | | 274 | 298 | 311 |
| | 60 to 100 | | 12 | 72 | 80 | 84 |
| | 60 to 100 | | 30 | 68 | 72 | 79 |
| Butanediol ester/diisodecyl phthalate (20/80). | 80 to 100 | 20 | | 12.5 | 17.8 | 18.2 |
| | 80 to 100 | 80 | | 18.6 | 18.6 | 19.0 |
| | 80 to 100 | | 12 | 12.0 | 13.0 | 14.0 |
| | 80 to 100 | | 30 | 11.0 | 11.0 | 12.0 |
| n-Octyl n-decyl phthalate. | 80 to 100 | 20 | | 12.2 | 13.8 | 16.1 |
| | 80 to 100 | 80 | | 13.5 | 14.7 | 16.9 |
| | 80 to 100 | | 12 | 11.0 | 12.0 | 14.0 |
| | 80 to 100 | | 30 | 9.0 | 10.0 | 13.0 |
| Diisodecyl phthalate. | 80 to 100 | 20 | | 32.5 | 36.3 | 35.1 |
| | 80 to 100 | 80 | | 34.0 | 37.1 | 37.5 |
| | 80 to 100 | | 12 | 23.0 | 25.0 | 28.0 |
| | 80 to 100 | | 30 | 22.0 | 23.0 | 25.0 |

The results with the plasticizers of the instant invention are comparable to the results obtained with n-octyl n-decyl phthalate. The plasticizers of the present invention impart low initial viscosity and exceptional viscosity stability to vinyl chloride resin plastisols as set forth supra. Consequently, the shelf life of vinyl resin dispersions is considerably improved.

EXAMPLE 18

[Wire insulation]

| | Parts |
|---|---|
| Resin, electrical grade, Pliovic EG 90 V (polyvinyl chloride) | 100 |
| Plasticizer D | 54 |
| Epoxy plasticizer, specifically butyl epoxy stearate (Terry Patent 2,559,177) | 4 |
| Dythal (dibasic lead phthalate) | 6 |
| Mark XI | 2 |
| Pigment No. 33 (Kaolin type clay) | 10 |

We claim:

1. A composition comprising a polymer of a vinylidene group containing compound and as a plasticizer for the polymer a mixture of (a) 15 to 25% of the 1,4-butanediol diesters of caprylic and capric acids and (b) 85 to 75% of diisodecyl phthalate.

2. A composition according to claim 1 wherein the mixture of 1,4-butanediol diesters contains 40 mol percent of caprylic acid and 60 mol percent of capric acid as the esterifying acid.

3. A composition comprising a vinyl chloride resin and as a plasticizer for the resin a mixture of (a) 15 to 25% of the 1,4-butanediol diesters of caprylic and capric acids and (b) 85 to 75% of diisodecyl phthalate.

4. A composition comprising a vinyl chloride resin and as a plasticizer for the resin a mixture of (a) 15 to 25% of the 1,4-butanediol diesters of caprylic and capric acids, 40 mol percent of the esterifying acid being caprylic acid and 60 mol percent of the esterifying acid being capric acid and (b) 85 to 75% of diisodecyl phthalate.

5. A composition according to claim 3 wherein 20% of the plasticizer is the butanediol esters and 80% is diisodecyl phthalate.

6. A composition according to claim 4 wherein 20% of the plasticizer is the butanediol esters and 80% is diisodecyl phthalate.

7. A composition comprising 60 to 70 parts of a vinyl chloride resin and 40 to 30 parts of a mixture of (a) 15 to 25% of the 1,4-butanediol diesters of caprylic and capric acids and (b) 85 to 75% of diisodecyl phthalate.

8. A composition comprising 60 to 70 parts of a vinyl chloride resin and 40 to 30 parts of a mixture of (a) 20% of the 1,4-butanediol esters of caprylic and capric acids, 40 mol percent of said esters being the caprylic acid ester and 60 mol percent of said esters being the capric acid ester and (b) 80% of diisodecyl phthalate.

9. A composition according to claim 1 wherein 35 to 45 mol percent of the esterifying acids is caprylic acid and correspondingly 65 to 55 mol percent of the esterifying acids is capric acid.

References Cited in the file of this patent

FOREIGN PATENTS 535,817   Canada _____ Jan. 15, 1957

OTHER REFERENCES

Darby et al.: "Modern Plastics," Volume 32, No. 10, June 1955, pages 148–54, 250.